E. S. LEAYCRAFT.
SPROCKET CHAIN.
APPLICATION FILED MAY 11, 1912.

1,138,766.

Patented May 11, 1915.

Witnesses:
Raphaël Netter
Edw. W. Vail Jr.

Inventor
Edwin S. Leaycraft,
By his Attorney
Ernest Hopkinson

UNITED STATES PATENT OFFICE.

EDWIN S. LEAYCRAFT, OF JERSEY CITY, NEW JERSEY.

SPROCKET-CHAIN.

1,138,766.

Specification of Letters Patent.   Patented May 11, 1915.

Application filed May 11, 1912. Serial No. 696,570.

*To all whom it may concern:*

Be it known that I, EDWIN S. LEAYCRAFT, a citizen of the United States, residing in Jersey City, county of Hudson, State of New Jersey, have invented certain new and useful Improvements in Sprocket-Chains, of which the following is a full, clear, and exact disclosure.

My invention comprises certain improvements in construction over my prior Patent, No. 601,347, issued March 29th, 1898, and its object is not only to improve the strength and durability, but also to give certain definite shapes and relations to the contact surfaces so that the friction between the links is greatly reduced and lost motion and liability of displacement of the links are obviated.

Figure 1:
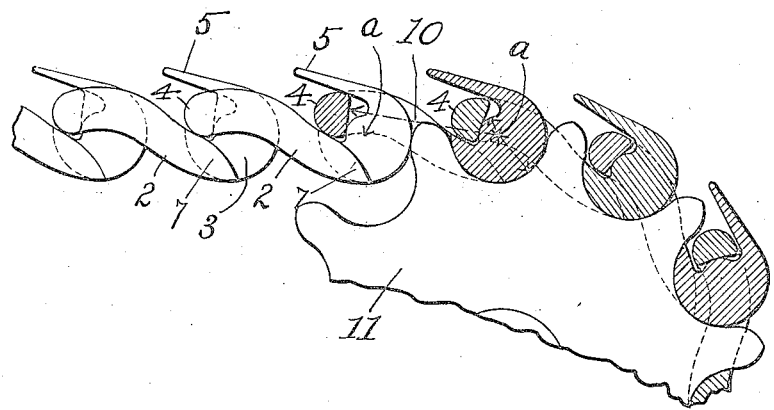
Figure 2:
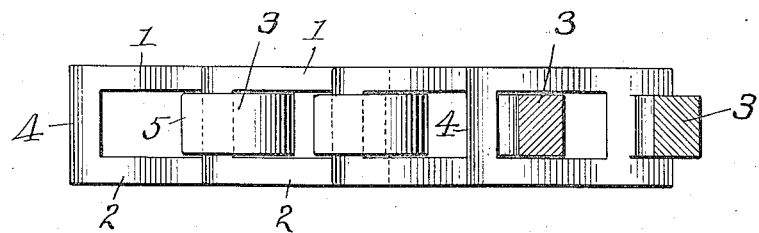
Figure 3:
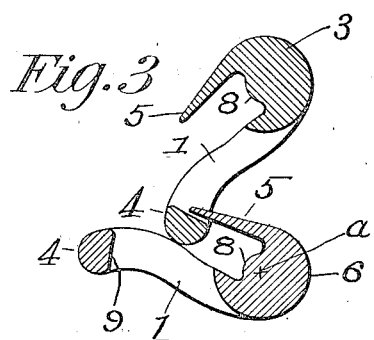
Figure 4:
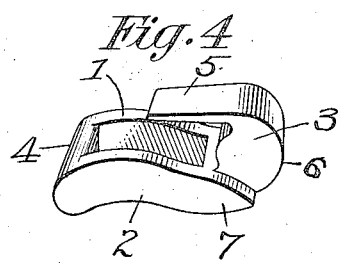

For a detailed description of one form of my invention, which I at present deem preferable, reference may be had to the following specification and to the accompanying drawing forming a part thereof, in which:

Figure 1 shows a side elevation of a chain and sprocket wheel, three of the links being shown in longitudinal section so as to indicate the relation of the contact surfaces; Fig. 2 is a plan view of a section of a sprocket chain, two of the links being shown in transverse section; Fig. 3 is a longitudinal section of two links showing the method of assembling the same to form a chain; and Fig. 4 is a perspective view of a detached link.

Referring to the drawing, the numerals 1 and 2 indicate the side bars of a link, the numeral 3 the hooked end of the bar, and the numeral 4 the transverse rocking bar at the opposite end of the link. The outer surface 5 of the hooked end of the bar 3 is tangent with the cylindrical surface 6 of the bar 3. This surface 6 is described about an axis indicated by the letter $a$. The side bars 2 and 3 overlap this cylindrical bar, as indicated at 7, thereby strengthening the link over the construction shown in my prior patent above referred to. The bearing surface 8 opposite the cylindrical surface 6 of the bar 3 and within the hooked end 5 is also cylindrical and is described about the same axis $a$, but of course is of a smaller radius, as indicated. The surfaces 8 of each link are adapted to engage and roll upon the opposite end bars of the adjacent links which have inner curved surfaces 9 which are also described about the axis $a$ of the same link, as indicated by the dot and dash line 10 in Fig. 1.

The sprocket wheel 11 is provided with the usual teeth, as concerns their shapes above the pitch line, but below the pitch line, are in the form of segments of circles which are of the same radius as the cylindrical surfaces 6. It should also be noted that the ends or plain faces of the cross bars 3 are broad and of a considerable area, thereby being less liable to wear by abrasion or friction with the adjacent link, and also since they practically fill the spaces between the side bars of the adjacent link, render the chain less liable to swing transversely out of the plane of the sprocket wheels.

From the above description it will be seen that I have provided a link in which all of the contact surfaces are movable about the same axis so that there will be a rolling instead of a sliding contact between said contact surfaces, thus greatly reducing the friction between the links.

By reference to Fig. 3, it will be seen that since the distance between the end of the hooked portion 5 of the bar 6 and the side bars 1 and 2 is substantially the same as the smallest dimension of the bars 4, the links can be disengaged only when turned at right angles to each other, as indicated in Fig. 3, and since the space between the side bars 1 and 2 and the hook 5 enlarges toward the surface 8, the links will not be disengaged after the surfaces 8 and 9 are once in contact until the one link has been again turned at right angles to the other. Thus it will be seen that the chain is easily assembled without the use of pins and nuts or other separate devices. The same is practically a complete inseparable whole, and the links cannot be separated unless the chain is removed from the sprocket wheels.

Having thus described this form of my invention, what I claim and desire to protect by Letters Patent is:

1. A sprocket chain comprising, successive similar links consisting of side bars, and transverse bars having respectively, convex and concave bearing surfaces, the convex bearing surface on one bar being described about the pivotal axis of that bar and the concave bearing surface on the other bar being described about said axis on the first named bar, said bearing surfaces being located on the inner sides of the respective bars.

2. A sprocket chain comprising links consisting of side bars and transverse bars, the contact surface on one bar being described about the axis of that bar and contact surfaces of the other bar being described about the axis of the first-mentioned bar, the former being convex and the latter concave, and said side bars extending over the ends of said transverse bars.

3. A sprocket chain comprising links having transverse bars, one of which is provided with a hooked guard and whose bearing surface is described about the axis of said bar, the other transverse bar having its concave contact surface described about the axis of the first mentioned bar.

4. A sprocket chain comprising links having transverse bars, one of which is provided with a hooked guard and whose bearing surface is described about the axis of said bar, the other transverse bar having a concave contact surface of greater radius than the inner contact surface of the first mentioned bar and being of a width substantially equal to the distance between the inner end of said hooked guard and its transverse bar.

5. A sprocket chain comprising links provided with transverse bearing bars having outer cylindrical sprocket bearing surfaces adapted to contact with the opposite sides of the sprocket teeth, parallel side bars located the same distance apart on each link, the side bars on each link overlapping those of the adjacent link, each pair of side bars being attached to a portion only of the ends of the sprocket bearing cross bar, and leaving the remaining portion of the ends of said cross bar unobstructed to allow movement of the adjacent side bars across the ends of said cross bar when the chain is flexed.

6. A sprocket chain comprising links having cross-bars and longitudinal side bars, one of said cross bars being substantially the same length as the distance between said side bars and having said side bars fixed to a portion only of the ends thereof.

7. A sprocket chain comprising links having cross-bars and longitudinal side bars, one of said cross bars having said side bars fixed to a portion only of the ends thereof and the inner edges of said side bars extending across the ends of said end bar on lines outside the axis of said end bar.

8. A sprocket chain comprising links having cross bars and longitudinal side bars, one of said cross bars having said side bars fixed to a portion only of the ends thereof to allow the side bars of an adjacent link to pass said ends when the chain is flexed, the inner contact surface on said cross bar being outside the plane of the edges of said side bars.

9. A sprocket chain comprising links having cross-bars and longitudinal side bars, one of said cross-bars having said side bars fixed to a portion only of the ends thereof to allow the side bars of an adjacent link to pass said ends when the chain is flexed, a hooked guard on said end bar opposite said side bars, the inner contact surface on said cross-bar being between the plane of the edges of said side bars and said hooked guard.

10. A sprocket chain, comprising successive similar links consisting of parallel side bars and transverse bars to the ends of which said side bars are attached, and having inner bearing surfaces contacting with adjacent links, one of said bars having a hooked guard and an outer continuous cylindrical bearing surface extending around opposite sides of the axis thereof and adapted to contact with opposite bearing surfaces on adjacent sprocket teeth.

Signed at the city, county and State of New York, this 10th day of May 1912.

EDWIN S. LEAYCRAFT.

Witnesses:
B. V. MOHAN,
EDW. W. VAILL.